(12) United States Patent
Takata

(10) Patent No.: US 11,835,714 B2
(45) Date of Patent: Dec. 5, 2023

(54) POLYGON MIRROR, OPTICAL DEFLECTOR, OPTICAL SCANNING DEVICE, AND IMAGE FORMING APPARATUS

(71) Applicant: CANON KABUSHIKI KAISHA, Tokyo (JP)

(72) Inventor: Atsushi Takata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/746,809

(22) Filed: May 17, 2022

(65) Prior Publication Data
US 2022/0382044 A1    Dec. 1, 2022

(30) Foreign Application Priority Data
May 28, 2021    (JP) .................................. 2021-090316

(51) Int. Cl.
*G03G 15/04*    (2006.01)
*G02B 26/12*    (2006.01)
*G02B 26/08*    (2006.01)

(52) U.S. Cl.
CPC ......... *G02B 26/12* (2013.01); *G02B 26/0816* (2013.01); *G03G 15/04* (2013.01); *G03G 15/04072* (2013.01)

(58) Field of Classification Search
CPC ............. G03G 15/04; G03G 15/04036; G03G 15/04072; G03G 15/0409; G02B 26/12; G02B 26/0816; G02B 5/04
See application file for complete search history.

(56) References Cited

U.S. PATENT DOCUMENTS

| 5,671,193 A | 9/1997 | Kuroda | |
|---|---|---|---|
| 2011/0127867 A1 | 6/2011 | Oh | |
| 2015/0226958 A1* | 8/2015 | Hayakawa | G02B 26/12 359/850 |
| 2019/0129326 A1* | 5/2019 | Takamura | G02B 26/12 |
| 2019/0322022 A1* | 10/2019 | Ohta | G03G 15/04036 |
| 2019/0322023 A1* | 10/2019 | Matsushita | |
| 2022/0373925 A1* | 11/2022 | Kobayashi | G03G 15/04036 |

FOREIGN PATENT DOCUMENTS

| JP | 2007-304624 A | 11/2007 |
| JP | 2010-117498 A | 5/2010 |
| JP | 2020-086322 A | 6/2020 |

* cited by examiner

*Primary Examiner* — Sophia S Chen
(74) *Attorney, Agent, or Firm* — Canon U.S.A., Inc., I.P. Division

(57) ABSTRACT

A polygon mirror includes a resin member, a first surface, a second surface facing the first surface, an inner surface joining the first and second surfaces to surround a through hole extending from the first to the second surface, and includes outer surfaces joining the first and second surfaces. A first segment between the first surface and the outer surfaces is defined as a first reference of a height in a direction from a second segment between the second surface and the outer surfaces to the first segment. The first surface includes a projection that forms the inner surface and projects from the first reference toward a side opposite to the second surface. The second segment is defined as a second reference of the height in the direction. The second surface includes a depressed portion distant from the outer surfaces and depressed from the second reference toward the first surface.

19 Claims, 14 Drawing Sheets

POLYGON MIRROR, OPTICAL DEFLECTOR, OPTICAL SCANNING DEVICE, AND IMAGE FORMING APPARATUS

BACKGROUND

Field

The present disclosure relates to a polygon mirror, an optical deflector, an optical scanning device, and an image forming apparatus.

Description of the Related Art

An optical scanning device for use in an image forming apparatus, such as a laser printer, optically modulates laser light emitted from a light source based on an image signal, and an optical deflector including a rotary polygon mirror deflects the optically-modulated laser light to perform scanning. The laser light deflected by the optical deflector is focused on a photosensitive drum, which is an example of an image bearing member, by a scanning lens, such as an fθ lens. An electrostatic latent image is thus formed on a surface of the photosensitive drum.

Polygon mirrors for use in this type of apparatuses incorporate various techniques to be resistant to deformation of a reflective surface, to prevent a deterioration in the optical characteristics.

Japanese Patent Application Laid-Open No. 2020-86322 discusses a polygon mirror having heat releasing projections that are provided to upper and lower portions of the polygon mirror.

When forces due to rotation of the polygon mirror act on the polygon mirror having the projections, there can be a case where excessive forces act on the projections. This may result in deformation of a reflective surface of the polygon mirror or occurrence of a vibration in the polygon mirror, which causes a deterioration in optical characteristics of the polygon mirror.

SUMMARY

The present disclosure is directed to providing an advantageous technique for improving optical characteristics of a polygon mirror.

According to an aspect of the present disclosure, a polygon mirror including a resin member includes a first surface, a second surface facing the first surface, an inner surface joining the first surface and the second surface, as a surface surrounding a through hole extending from the first surface to the second surface, and a plurality of outer surfaces joining the first surface and the second surface on a side opposite to the inner surface, wherein a first segment between the first surface and the plurality of outer surfaces is defined as a first reference of a height in a direction from a second segment between the second surface and the plurality of outer surfaces to the first segment, wherein the first surface includes at least one projection projecting from the first reference toward a side opposite to the second surface, wherein the second segment is defined as a second reference of the height in the direction, wherein the second surface includes at least one depressed portion depressed from the second reference toward the first surface, wherein the at least one depressed portion is distant from the plurality of outer surfaces, and wherein the at least one projection forms the inner surface.

Further features of the present disclosure will become apparent from the following description of exemplary embodiments with reference to the attached drawings.

DESCRIPTION OF THE EMBODIMENTS

Figure 1:
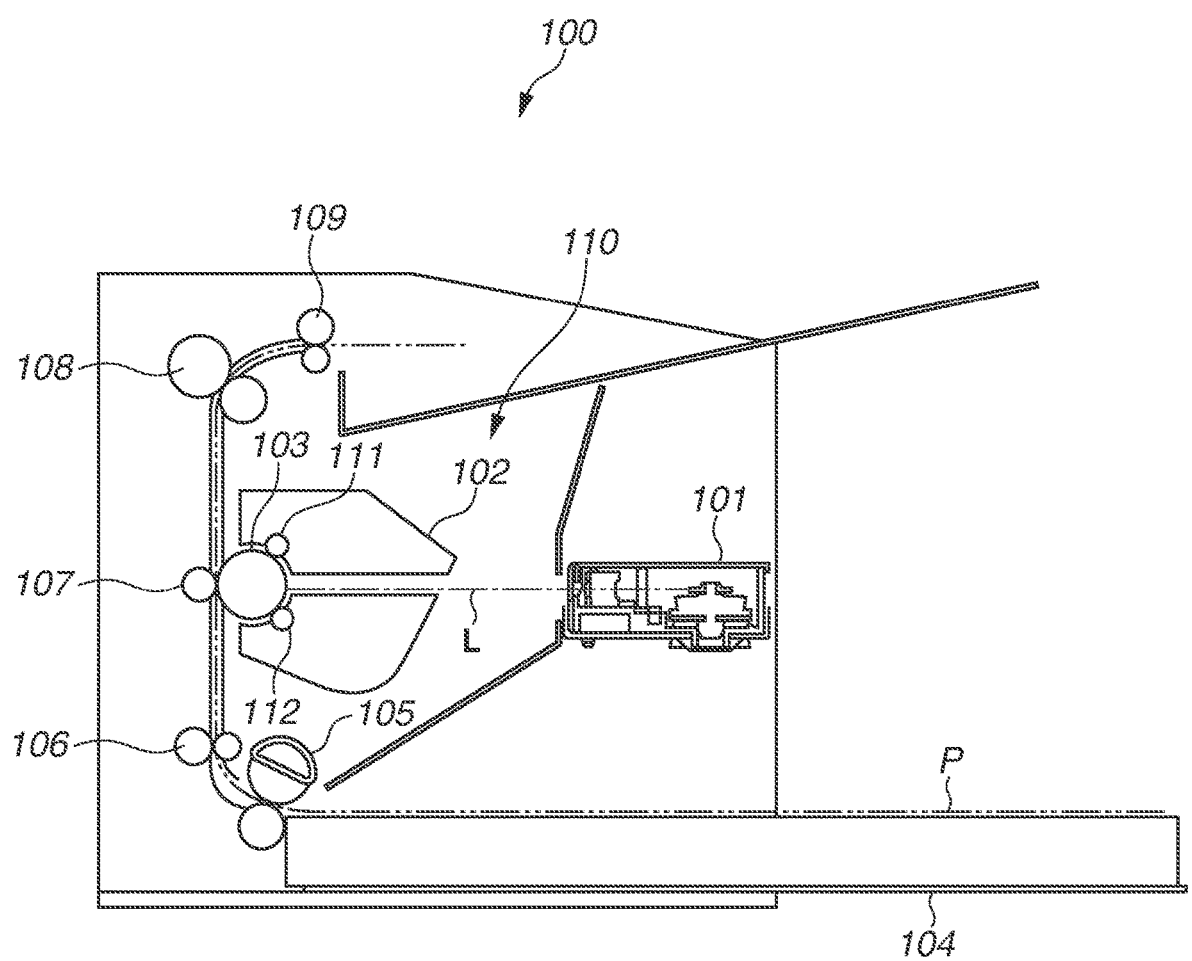
FIG. 1 is a schematic cross-sectional view illustrating an image forming apparatus according to a first exemplary embodiment.

Various exemplary embodiments of the present disclosure will be described below with reference to the drawings. It should be noted that each exemplary embodiment described below is one of exemplary embodiments of the present disclosure and that the scope of the present disclosure is not limited to the exemplary embodiments described below. Corresponding components are described with reference to a plurality of drawings, and redundant descriptions of corresponding components that are given the same reference numeral are omitted. Different items having the same name are discriminated from each other by adding an ordinal number, e.g., a first item and a second item.

FIG. 1 is a schematic cross-sectional view illustrating an image forming apparatus 100 according to a first exemplary embodiment. The image forming apparatus 100 uses an electrophotography method. While the image forming apparatus 100 in FIG. 1 is a printer, the image forming apparatus 100 is not limited to printers and can be a copy machine, a facsimile, or a multi-function peripheral.

The image forming apparatus 100 includes an image forming unit 110. The image forming unit 110 forms images on sheets P that are recording materials. The image forming unit 110 includes an optical scanning device 101, a process cartridge 102, a transfer roller 107, and a fixing device 108. The transfer roller 107 is an example of a transfer portion. The process cartridge 102 includes a photosensitive drum 103, a charging unit 111, and a development unit 112. The photosensitive drum 103 is an example of an image bearing member.

The optical scanning device 101 emits laser light L based on acquired image information and irradiates the photosensitive drum 103 of the process cartridge 102 with the laser light L to scan a surface of the photosensitive drum 103 with the laser light L. A latent image is thus formed on the photosensitive drum 103, and the formed latent image is visualized as a toner image by the process cartridge 102 using a toner as a developer agent.

Meanwhile, sheets P stacked on a sheet stacking plate 104 are separated and fed one by one by a sheet feeding roller 105, and the fed sheet P is conveyed to a nip portion between the photosensitive drum 103 and the transfer roller 107 by a sheet conveying roller 106. The toner image formed on the photosensitive drum 103 is transferred onto the sheet P at the nip portion by the transfer roller 107.

The sheet P with the toner image, which has been transferred and unfixed, is conveyed further downstream to the fixing device 108. The fixing device 108 includes a heating member therein and heats and presses the sheet P to fix the toner image as an image to the sheet P. Thereafter, the sheet P is discharged to the outside of the image forming apparatus 100 by a sheet discharging roller 109.

Figure 2A:
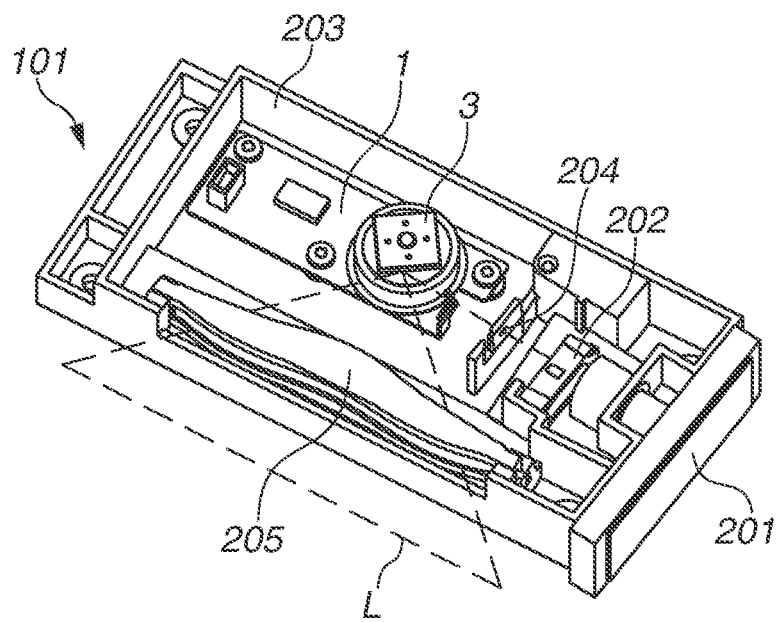
FIG. 2A is a perspective view schematically illustrating an optical scanning device according to the first exemplary embodiment.

FIG. 2A is a perspective view schematically illustrating the optical scanning device 101 according to the first exemplary embodiment. The optical scanning device 101 includes a housing 203, a light source 201, a cylindrical lens 202, an fθ lens 205, and a scanner motor 1. The light source 201, the cylindrical lens 202, the fθ lens 205, and the scanner motor 1 are supported by the housing 203. The scanner motor 1 is an example of an optical deflector. The housing 203 includes an optical diaphragm 204 formed therein. The laser light L emitted from the light source 201 is focused by the cylindrical lens 202, whereby the diameter of the laser light L is limited to a predetermined beam diameter by the optical diaphragm 204.

The laser light L having traveled through the optical diaphragm 204 is deflected by the scanner motor 1, travels through the fθ lens 205, and is focused on the photosensitive drum 103 illustrated in FIG. 1, whereby an electrostatic latent image is formed on the photosensitive drum 103.

The light source 201, the cylindrical lens 202, and the scanner motor 1 are in the housing 203. An opening portion of the housing 203 is closed with a resin or metal optical cover (not illustrated).

Figure 2B:
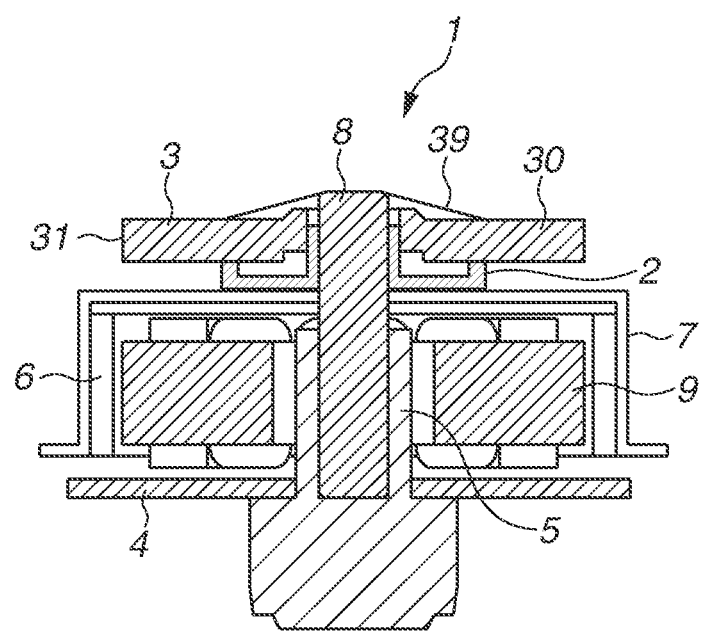
FIG. 2B is a cross-sectional view illustrating a scanner motor according to the first exemplary embodiment.

FIG. 2B is a cross-sectional view illustrating the scanner motor 1 according to the first exemplary embodiment. FIG. 2B schematically illustrates a section surface of the scanner motor 1 taken along a surface including a rotation center. The scanner motor 1 includes a substrate 4 consisting of a sheet metal, a bearing sleeve 5 fixed to the substrate 4, a rotor 7 including a rotor magnet 6, and a rotation axis 8 rotatably supported by the bearing sleeve 5 and integrated into the rotor 7. Further, the scanner motor 1 includes a seat 2 integrated into the rotor 7, a stator coil 9 fixed to the substrate 4, a polygon mirror 3 fixed to the rotation axis 8 via the seat 2, and a spring 39 which is for pressing the polygon mirror 3 against the seat 2 of the scanner motor 1 to prevent the seat 2 from spinning around. The rotor 7 and the stator coil 9 form the scanner motor 1 that is an example of a driving source for rotating and driving the polygon mirror 3. The polygon mirror 3 is rotated to deflect the laser light L illustrated in FIG. 2A. The polygon mirror 3 includes a resin member 30 and a reflective coating 31. The resin member 30 is a resin base material. The reflective coating 31 is formed on each side surface of the resin member 30.

Next, the polygon mirror 3 according to a second exemplary embodiment will be described below. Redundant descriptions of configurations according to the second exemplary embodiment that are similar to those according to the first exemplary embodiment are omitted.

Figure 3A:
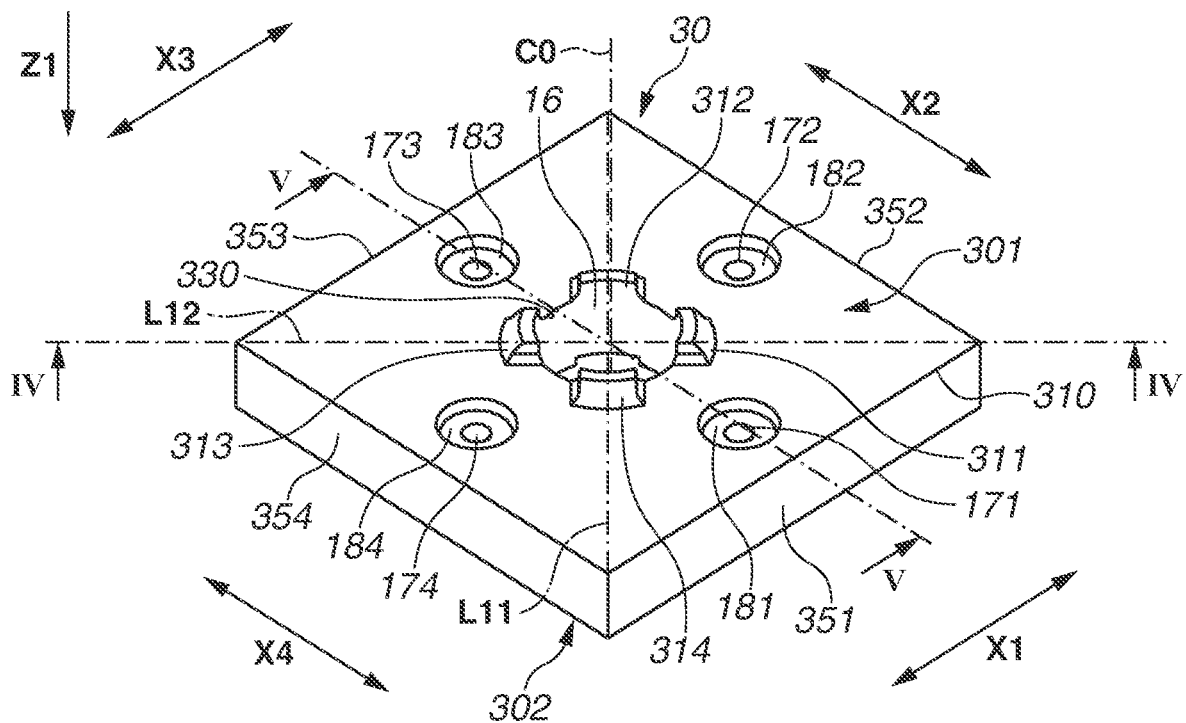
FIGS. 3A and 3B are perspective views illustrating a resin member of a polygon mirror according to a second exemplary embodiment.
Figure 3B:
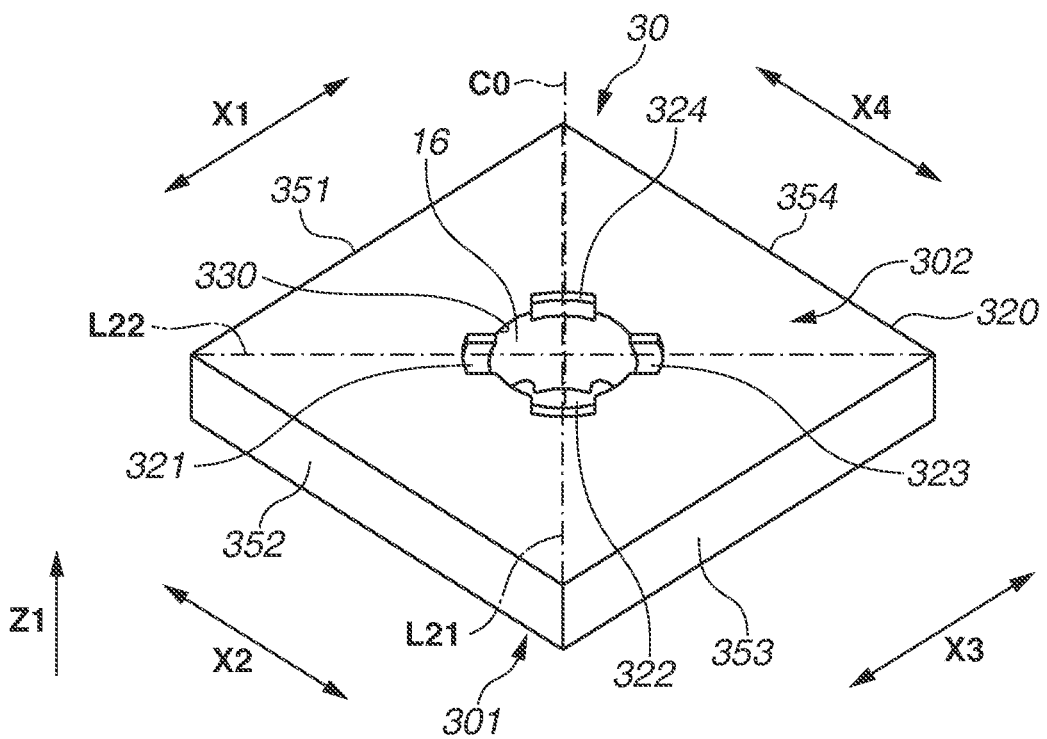

FIGS. 3A and 3B are perspective views illustrating the resin member 30 of the polygon mirror 3 according to the present exemplary embodiment. FIG. 3A is a top perspective view illustrating the resin member 30 of the polygon mirror 3, and FIG. 3B is a bottom perspective view illustrating the resin member 30 of the polygon mirror 3. The resin member 30 has an outer surface 351 extending along a plane X1, an outer surface 352 extending along a plane X2, an outer surface 353 extending along a plane X3, and an outer surface 354 extending along a plane X4. An arrow Z1 indicates an extending direction of a virtual line C0.

The resin member 30 is a prism shaped resin member, and more specifically, in the present exemplary embodiment, the resin member 30 is a rectangular prism shaped resin member. It is desirable that a thermoplastic resin is used as a resin material for the resin member 30. Among thermoplastic resins, a cycloolefin polymer, cycloolefin copolymer, polycarbonate, or acryl is desirable for use.

The resin member 30 includes a top surface 301 and a bottom surface 302. The top surface 301 is a first surface, and the bottom surface 302 is a second surface facing the first surface. The resin member 30 further includes an inner surface 330 joining the first surface and the second surface and a plurality of outer surfaces, the number of which is four, i.e., the outer surfaces 351, 352, 353, and 354, in the present exemplary embodiment. The outer surfaces 351, 352, 353, and 354 join the first surface and the second surface on a side opposite to the inner surface 330. A through hole 16 is formed at a position including the virtual line C0 passing through an intersection of two diagonal lines L11 and L12 of the top surface 301 and an intersection of two diagonal lines L21 and L22 of the bottom surface 302. The inner surface 330 is formed as a surface surrounding the through hole 16. Specifically, the virtual line C0 is a rotation center line of the resin member 30 and is a central axis of the through hole 16.

The rotation axis 8 illustrated in FIG. 2B is inserted in the through hole 16. While, in the present exemplary embodiment, the through hole 16 is a circular shaped hole, the shape is not limited to a circular shape.

Figure 4A:
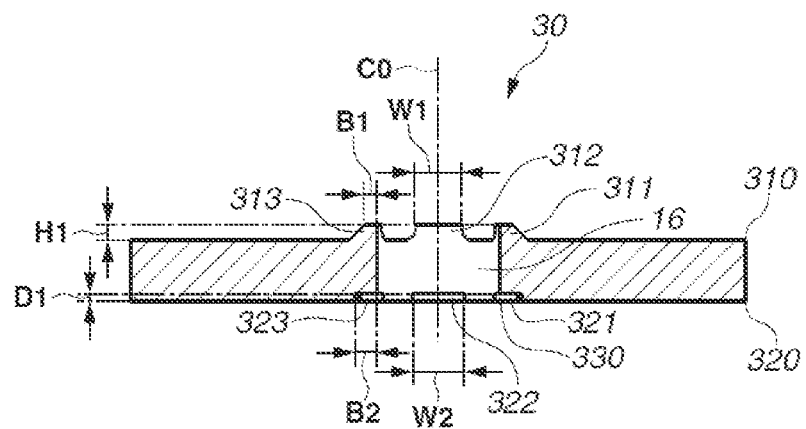
FIG. 4A is a first cross-sectional view illustrating the resin member according to the second exemplary embodiment.
Figure 4B:
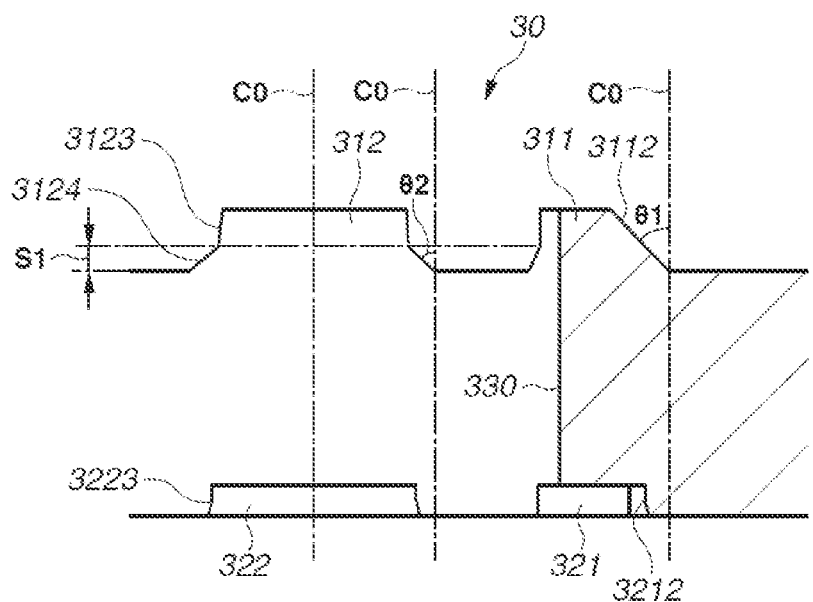
FIG. 4B is an enlarged view illustrating a main portion of the resin member illustrated in FIG. 4A.

FIG. 4A is a first cross-sectional view illustrating the resin member 30 according to the present exemplary embodiment. FIG. 4A illustrates a first section of the resin member 30 taken along a line IV-IV specified in FIG. 3A. FIG. 4B is an enlarged view illustrating a main portion of the resin member 30 illustrated in FIG. 4A.

Figure 5:
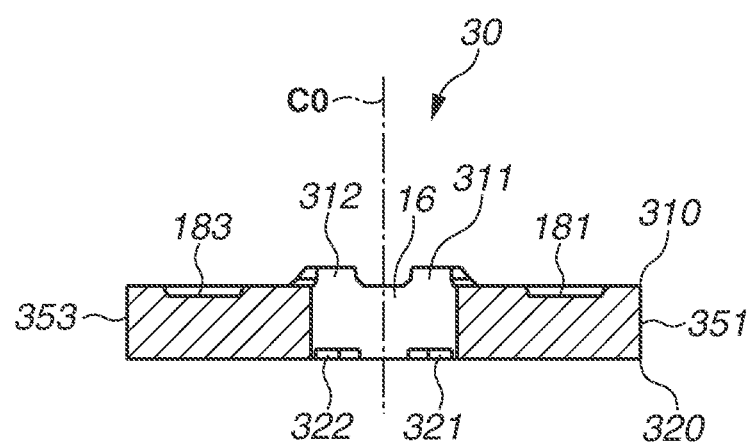
FIG. 5 is a second cross-sectional view illustrating the resin member according to the second exemplary embodiment.

FIG. 5 is a second cross-sectional view illustrating the resin member 30 according to the present exemplary embodiment. FIG. 5 illustrate a second section of the resin member 30 taken along a line V-V specified in FIG. 3A.

A first segment 310 between the first surface and the outer surfaces 351 to 354 is defined as a first reference of a height in a direction from a second segment 320 between the second surface and the outer surfaces 351 to 354 to the first segment 310 between the first surface and the outer surfaces 351 to 354. The top surface 301 includes at least one projection projecting from the first reference toward a side opposite to the bottom surface 302. The projection is disposed on the diagonal lines L11 and L12 of the top surface 301 and forms the inner surface 330. While, in the present exemplary embodiment, the number of projections disposed on the diagonal lines L11 and L12 at positions forming the inner surface 330 is four, i.e., the projections 311, 312, 313, and 314, the least number of the projections is one. Since the projections 311 to 314 form the inner surface 330, forces that act on the polygon mirror 3 by rotation of the polygon mirror 3 or the like can be reduced. The desirable number of projections is the same number as the number of the outer surfaces, or more desirably, the number of the projections is an integral multiple of the number of the outer surfaces.

A structure of the projections 311 to 314 will be described below with reference to FIG. 4B. The projection 311 includes a side surface 3112 on a side in a direction vertical to the virtual line C0, and a side surface on a side in a rotation direction of the resin member 30. The side surface on the side in the direction vertical to the virtual line C0 refers to a surface facing outward among side surfaces on the side in the direction vertical to the virtual line C0. The side surface 3112 on the side in the direction vertical to the virtual line C0 is tilted with respect to the virtual line C0 serving as a rotation axis of the resin member 30. Each of the projections 312 to 314 has a configuration similar to the projection 311 as described above.

The direction vertical to the virtual line C0 herein is the same direction as a radial direction of the through hole 16, and the rotation direction of the resin member 30 herein is the same direction as a circumferential direction of the through hole 16.

A side surface 3123 on the side in the rotation direction of the resin member 30 includes a tilt portion 3124 on a root side of the projection 312. The tilt portion 3124 is tilted with respect to the virtual line C0.

Since the side surface 3123 of the projection 312 on the side in the rotation direction of the resin member 30 includes the tilt portion 3124, and also the similar configuration is implemented in each of the projections 311, 313, and 314, wind pressure caused by rotation of the resin member 30 is passed through. This prevents vibration in the polygon mirror 3, whereby a deterioration in optical characteristics due to the vibration can be prevented.

Furthermore, wind noise caused by rotation of the polygon mirror 3 is also reduced.

Since the side surface 3112 of the projection 311 on the side in the direction vertical to the virtual line C0 is a tilted surface, and also the similar configuration is implemented in each of the projections 312 to 314, even in a case where excessive forces act on the projections 311 to 314 by rotation of the polygon mirror 3, the projections 311 to 314 prevent deformation of the polygon mirror 3, whereby a deterioration in optical characteristics of the polygon mirror 3 can be prevented.

Further, since the virtual line C0 is a rotation center axis and the projections 311 to 314 are disposed near the virtual line C0, excessive forces unlikely act on the projections 311 to 314. The projections 311 to 314 forming the inner surface 330 may not be contiguous to an inner surface extending in a range of the height from the first reference to a second reference. In a case where a distance from the inner surface, extending in the range of the height from the first reference to the second reference, to the projections 311 to 314 is smaller than or equal to a height H1 of the projections 311 to 314 in the direction vertical to the virtual line C0, it can be defined that the projections 311 to 314 form the inner surface 330.

According to the present exemplary embodiment, the projections 311 to 314 disposed on the top surface 301 have the side surfaces tilted with respect to the virtual line C0, on both the side in the direction vertical to the virtual line C0 and the side in the rotation direction of the resin member 30. Alternatively, the surfaces tilted with respect to the virtual line C0 may be provided on either the side surfaces of the projections 311 to 314 on the side in the direction vertical to the virtual line C0 or the side surfaces of the projections 311 to 314 on the side in the rotation direction of the resin member 30.

The top surface 301 has holes 181, 182, 183, and 184 which are depressed toward the bottom surface 302 from the first reference and correspond to phases of the outer surfaces 351 to 354 about the virtual line C0. While, in the present exemplary embodiment, the number of the holes is four, i.e., the holes 181 to 184, the least number of the holes is one.

The bottom surface 302 includes depressed portions 321, 322, 323, and 324 that are depressed from the second reference toward the top surface 301 and disposed on the diagonal lines L21 and L22. The second segment 320 is defined as the second reference of the height in the direction from the second segment 320 between the second surface and the outer surfaces 351 to 354 to the first segment 310 between the first surface and the outer surfaces 351 to 354. While, in the present exemplary embodiment, the number of the depressed portions is four, i.e., the depressed portions 321 to 324, the least number of the depressed portion is one. The desirable number of the depressed portions is the same number as the number of projections of the top surface 301 and the desirable positions of the depressed portions are positions corresponding to the phases of the projections of the top surface 301. The depressed portions 321 to 324 have configurations similar to each other. The depressed portions 321 to 324 overlap the projections 311 to 314 at least partially in a direction from the first segment 310 to the second segment 320. The depressed portion 321 includes a side surfaces 3212 on the side in the direction vertical to the virtual line C0, and the side surface 3212 on the side in the direction vertical to the virtual line C0 can include a tilt portion tilted with respect to the virtual line C0. Similarly, the depressed portion 322 includes a side surface 3223 on the side in the rotation direction of the resin member 30, and the side surface 3223 on the side in the rotation direction of the resin member 30 can include a tilt portion tilted with respect to the virtual line C0. This structure facilitate engagement between a projection of a top surface of a resin member and a depressed portion of a bottom surface of another resin member in stacking the plurality of resin members 30. The bottom surface 302 includes the depressed portions 322 to 324 having side surfaces, on the side in the direction vertical to the virtual line C0, having a function similar to the function of the side surface 3212 of the depressed portion 321 on the side in the direction vertical to the virtual line C0. The bottom surface 302 includes the depressed portions 321, 323, and 324 having side surfaces, on the side in the rotation direction of the resin member 30, having a function similar to the function of the side surface 3223 of the depressed portion 321 on the side in the rotation direction of the resin member 30. The depressed portions 321 to 324 are disposed distant from the outer surfaces 351 to 354.

Due to the projections 311 to 314 forming the inner surface 330 on the first surface and the depressed portions 321 to 324 on the second surface, forces are dispersed in the polygon mirror 3 in comparison with a flat polygon mirror, whereby a polygon mirror increased in strength is formed. Further, the depressed portions 321 to 324 contribute to the reduction of the weight of the polygon mirror 3.

The height H1 of the projections 311 to 314 of the first surface is greater than a depth D1 of the depressed portions 321 to 324 of the second surface. Thus, a space is formed between the top surface 301 of a lower resin member 30 and the bottom surface 302 of an upper resin member 30 in stacking the resin members 30, and the resin members 30 are arranged at regular spaces. Further, a height S1 of the tilt portion 3124 of the side surface 3123 of the projection 312 in the rotation direction of the resin member 30 is less than or equal to a difference between the height H1 of the projections 311 to 314 and the depth D1 of the depressed portions 321 to 324 (H1−D1≥S1). Thus, interference between the depressed portion 322 and the tilt portion 3124 of the side surface 3123 of the projection 312 in the rotation direction of the resin member 30 is prevented.

A height H1 of the projections 311 to 314 is greater than the height S1 of the tilt portion 3124 of the side surface 3123 of the projection 312 on the side in the rotation direction of the resin member 30. Thus, in stacking the resin members 30, surfaces excluding the tilt portion 3124 of the side surface 3123 of the projection 312 on the side in the rotation direction of a resin member 30 become a matching surface with respect to the side surface 3223 of the depressed portion 322 on the side in the rotation direction of the resin member 30 on the second surface of another resin member 30, whereby the plurality of resin members 30 is rotated together in the rotation direction of the resin member 30.

In the present exemplary embodiment, the height H1 is, for example, 0.5 mm, and the depth D1 is, for example, 0.3 mm. Alternatively, the height H1 of the projections 311 to 314 is a value in a range from 0.4 mm to 0.7 mm, and the depth D1 of the depressed portions 321 to 324 is a value in a range from 0.1 mm to 0.35 mm. Further, in the present exemplary embodiment, the height S1 of the tilt portion 3124 of the side surface 3123 of the projection 312 on the side in the rotation direction of the resin member 30 is, for example, 0.2 mm. Alternatively, the height S1 is a value greater than 0 mm and less than or equal to 0.35 mm.

A width W1 of the projections 311 to 314 in the rotation direction of the resin member 30 is less than a width W2 of the depressed portions 321 to 324 in the rotation direction of the resin member 30. A width B1 of the projections 311 to 314 in the direction vertical to the virtual line C0 is less than a width B2 of the depressed portions 321 to 324 in the direction vertical to the virtual line C0.

The width W1 of the projections 311 to 314 in the rotation direction of the resin member 30 is, for example, 0.15 mm, and the width W2 of the depressed portions 321 to 324 in the rotation direction of the resin member 30 is, for example, 0.17 mm. Since the width W1 is less than the width W2, the projections 311 to 314 are smoothly inserted into the depressed portions 321 to 324. Further, the width B1 of the projections 311 to 314 in the direction vertical to the virtual line C0 is, for example, 0.20 mm. The width B2 of the depressed portions 321 to 324 in the direction vertical to the virtual line C0 is, for example, 0.35 mm. Since the width B1 is less than the width B2, the projections 311 to 314 are smoothly inserted into the depressed portions 321 to 324. The width W1 of the projections 311 to 314 in the rotation direction of the resin member 30 is 0.05 mm to 0.25 mm, and the width W2 in the rotation direction of the resin member 30 is 0.07 mm to 0.27 mm. Further, the width B1 of the depressed portions 321 to 324 in the direction vertical to the virtual line C0 is 0.10 mm to 0.30 mm, and the width B2 of the depressed portions 321 to 324 in the rotation direction of the resin member 30 is 0.25 mm to 0.45 mm.

Figure 6:
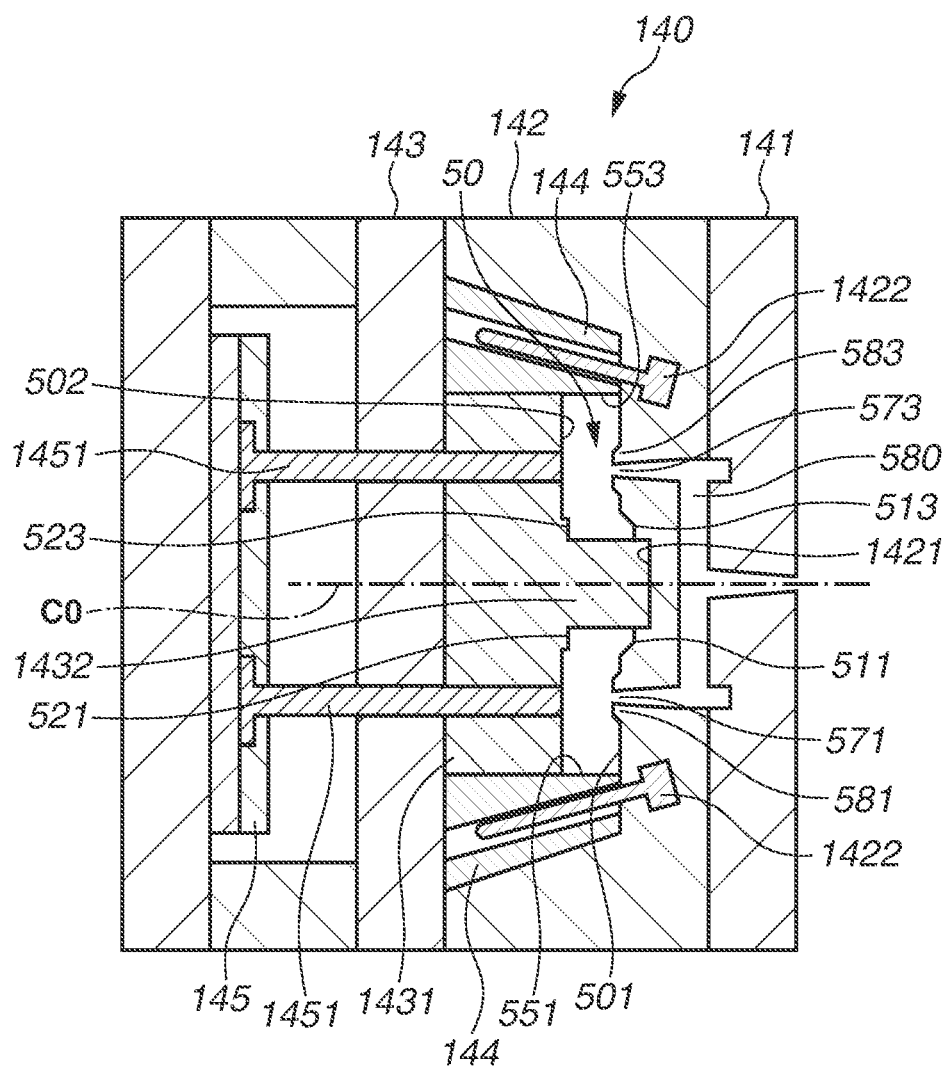
FIG. 6 is a schematic cross-sectional view illustrating a mold according to the second exemplary embodiment.

Next, a mold for use in manufacturing the resin member 30 will be described below. FIG. 6 is a schematic cross-sectional view illustrating a mold 140 according to the present exemplary embodiment. FIG. 6 illustrates the mold 140 in a clamped state. The mold 140 includes a cavity 50 for forming the resin member 30. With the mold 140 in the clamped state, the cavity 50 is defined.

Figure 7A:
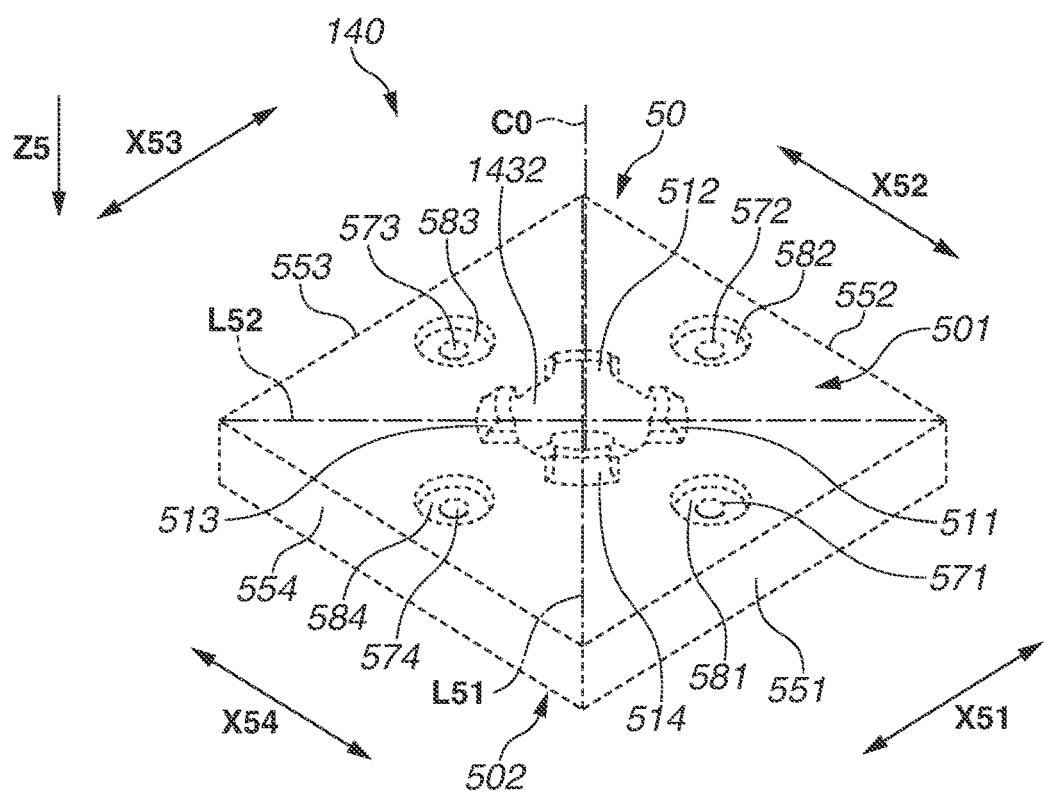
FIGS. 7A and 7B are perspective views illustrating a cavity of the mold according to the second exemplary embodiment.
Figure 7B:
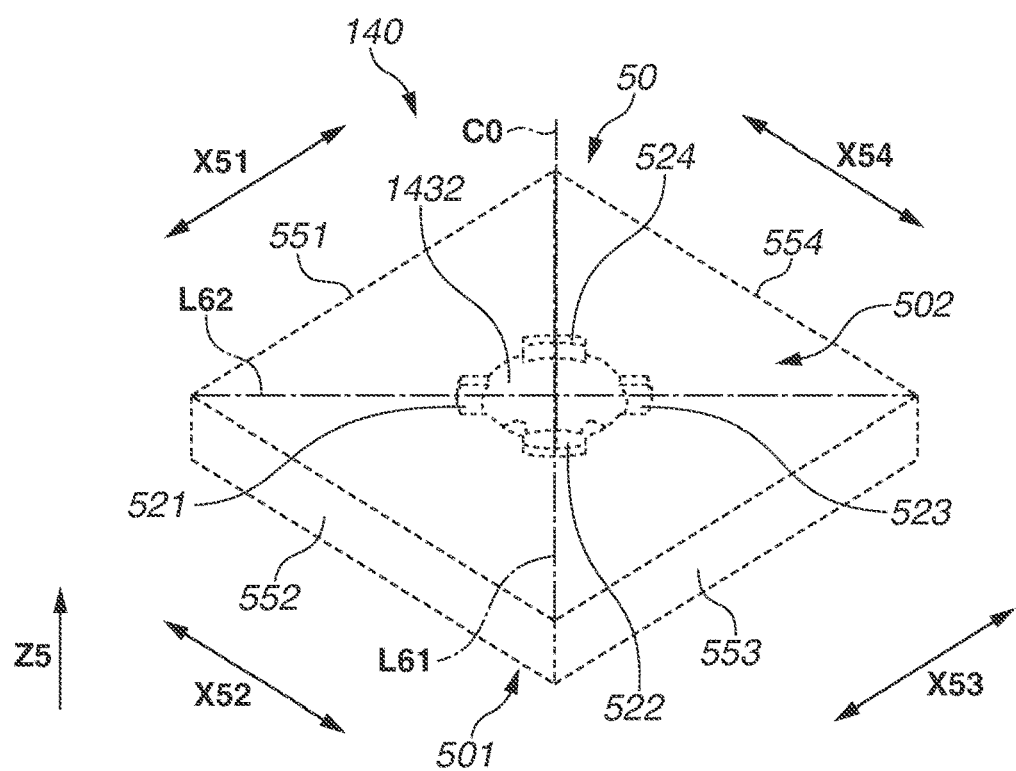

FIGS. 7A and 7B are perspective views illustrating the cavity 50 of the mold 140 according to the first exemplary embodiment. FIG. 7A is a top perspective view of the cavity 50, and FIG. 7B is a bottom perspective view of the cavity 50. The mold 140 has a side surface forming surface 551 extending along a plane X51, a side surface forming surface 552 extending along a plane X52, a side surface forming surface 553 extending along a plane X53, and a side surface forming surface 554 extending along a plane X54. An arrow Z5 indicates an extending direction of a virtual line C0.

The cavity 50 has a prism shape, and more specifically, in the present exemplary embodiment, the cavity 50 is a rectangular prism shaped empty space. The mold 140 includes a top surface forming surface 501 and a bottom surface forming surface 502. The top surface forming surface 501 transfers the top surface 301 of the resin member 30, and the bottom surface forming surface 502 transfers the bottom surface 302 of the resin member 30. Further, the mold 140 includes a plurality of side surface forming surfaces for transferring the plurality of outer surfaces of the resin member, the number of which is four, i.e., the side surface forming surfaces 551, 552, 553, and 554 for transferring the outer surfaces 351 to 354 of the resin member 30 in the present exemplary embodiment. The plurality of surfaces 501, 502, and 551 to 554 defines the cavity 50.

The mold 140 includes a runner stripper plate 141, a cavity plate 142, and a core plate 143. The runner stripper plate 141 and the cavity plate 142 define a runner 580.

The cavity plate 142 includes the top surface forming surface 501, a plurality of gates 571, 572, 573, and 574 for injecting a molten resin into the cavity 50, a mold hole 1421, and an angular pin 1422. The mold hole 1421 is concentric with the through hole 16.

Specifically, a central line of the mold hole 1421 is the virtual line C0. The desirable number of gates according to the present exemplary embodiment is the same number as the number of the side surface forming surfaces 551 to 554, which is four. This increases symmetry of a pressure distribution in the resin member 30 in an injection process described below, and shape accuracy of the outer surfaces 351 to 354 serving as light reflecting surfaces increases.

Further, the gates 571 to 574 and the side surface forming surfaces 551 to 554 are desirably disposed at positions corresponding to each other in terms of phases about the virtual line C0 serving as a central axis line of the mold hole 1421. This further increases the symmetry of the pressure distribution in the resin member 30 in the injection process, and the shape accuracy of the outer surfaces 351 to 354 serving as light reflecting surfaces further increases. Further, generation of welds between the gates 571 to 574 are controlled to end portions of the outer surfaces 351 to 354 that are outside the range of scanning of the laser light L in FIG. 2A.

The core plate 143 includes a moving-side core 1431, a slide core 144, and an ejector plate 145. The moving-side core 1431 includes the bottom surface forming surface 502 and a mold shaft 1432. The slide core 144 includes the side surface forming surfaces 551 to 554. As the core plate 143 is moved for opening/closing, the slide core 144 is guided by the angular pin 1422 and slid in a direction perpendicular to the virtual line C0. The mold shaft 1432 is for forming the through hole 16.

The ejector plate 145 desirably includes the same number of ejector pins as the number of the side surface forming surfaces, which is the side surface forming surfaces 551 to 554 and the number is four. This enables even distribution of forces in the resin member 30 when an ejector pin 1451 is projected from the mold 140 in a process of releasing the resin member 30, whereby a deformation of the resin member 30 in the releasing is prevented or reduced.

The top surface forming surface 501 is rectangular and therefore has the two diagonal lines L51 and L52. Similarly, the bottom surface forming surface 502 is rectangular and therefore has the two diagonal lines L61 and L62.

The top surface forming surface 501 includes depressed portions 511, 512, 513, and 514 that are depressed from the top surface forming surface 501 and disposed on the diagonal lines L51 and L52. While the number of depressed portions on the diagonal lines L51 and L52 is four, i.e., the depressed portions 511 to 514, in the present exemplary embodiment, the least number of the depressed portion is one. The depressed portions 511 to 514 have configurations similar to each other.

Each of the depressed portions 511 to 514 includes a side surface on the side in the direction vertical to the virtual line C0 and a side surface on the side in the rotation direction of the resin member 30. Each of the side surfaces on the side in the direction vertical to the virtual line C0 is tilted with respect to the virtual line C0. Each of the side surfaces on the side in the rotation direction of the resin member 30 includes a tilt portion tilted with respect to the virtual line C0 on a root side of corresponding one of the depressed portions 511 to 514.

The top surface forming surface 501 includes protrusions 581, 582, 583, and 584 that protrude from the top surface forming surface 501 and disposed at positions corresponding to the phases of the side surface forming surfaces 551 to 554 about the virtual line C0.

While at least one hole corresponding to the phases of the side surface forming surfaces 551 to 554 about the virtual line C0 corresponds to the four protrusions in the present exemplary embodiment, the least number of the protrusions is one.

The bottom surface forming surface 502 includes protrusions 521, 522, 523, and 524 that protrude from the bottom surface forming surface 502 and disposed on the diagonal lines L61 and L62. While the number of the protrusions disposed on the diagonal lines L61 and L62 is four, i.e., the protrusions 581 to 584, in the present exemplary embodiment, the least number of the protrusions is one.

Similarly to the resin member 30, a depth of the depressed portions 511 to 514 is greater than a height of the protrusions 521 to 524. A depth of the side surfaces of the depressed portions 511 to 514 on the side in the direction vertical to the virtual line C0 is greater than a depth of the tilt portions of the side surfaces of the depressed portions 511 to 514 on the side in the rotation direction of the resin member 30. The depth of the tilt portions of the side surfaces of the depressed portions 511 to 514 on the side in the rotation direction of the resin member 30 is equal to or less than a difference between the depth of the depressed portions 511 to 514 and the height of the protrusions 521 to 524. A width of the depressed portions 511 to 514 in the rotation direction of the resin member 30 is less than a width of the protrusions 521 to 524 in the rotation direction of the resin member 30. A width of the depressed portions 511 to 514 in the direction vertical to the virtual line C0 is less than a width of the protrusions 521 to 524 in the direction vertical to the virtual line C0.

Next, a method for manufacturing the polygon mirror 3 will be described below. FIGS. 8A to 8C and 9A to 9C are explanatory diagrams illustrating processes of a method for manufacturing the resin member 30 of the polygon mirror 3 according to the present exemplary embodiment. FIG. 10 is an explanatory diagram illustrating a process of a method for manufacturing the reflective coating 31 of the polygon mirror 3 according to the first exemplary embodiment. In a mold opening process illustrated in FIG. 8A, the mold 140 is opened. Next, in a clamping process illustrated in FIG. 8B, the mold 140 is clamped. In this process, the mold shaft 1432 of the core plate 143 is engaged with the mold hole 1421 of the cavity plate 142, whereby the cavity plate 142 and the core plate 143 are aligned and the cavity 50 is defined in the mold 140.

Figure 8A:
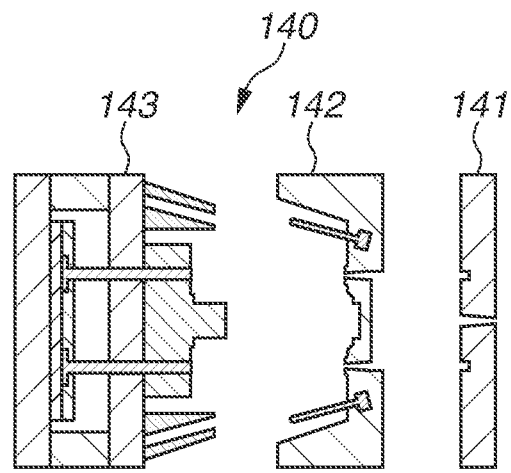
FIGS. 8A to 8C are explanatory diagrams each illustrating a process of manufacturing the resin member of the polygon mirror according to the second exemplary embodiment.
Figure 8B:
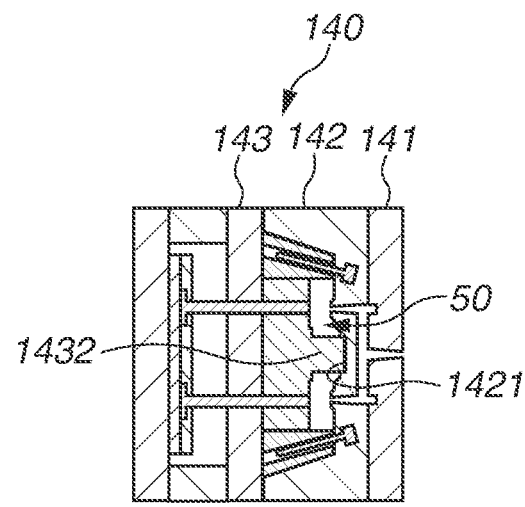
Figure 8C:
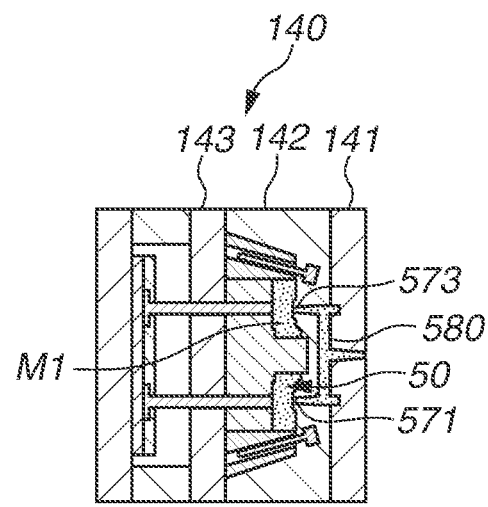

Next, in an injection process illustrated in FIG. 8C, a molten resin M1 is injected into the cavity 50 through the runner 580 and the gates 571 to 574 in FIG. 7A by an injection molding machine (not illustrated).

Figure 9A:
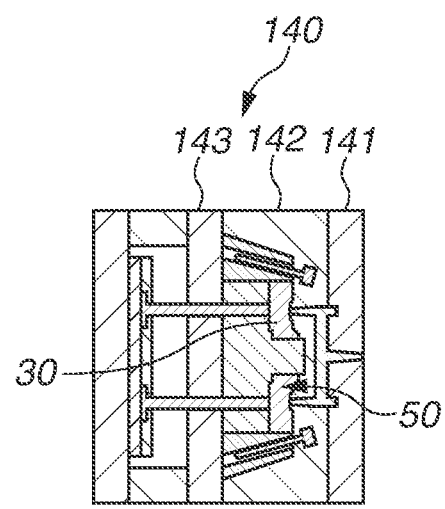
FIGS. 9A to 9C are explanatory diagrams each illustrating a process of manufacturing the resin member of the polygon mirror according to the second exemplary embodiment.
Figure 10:
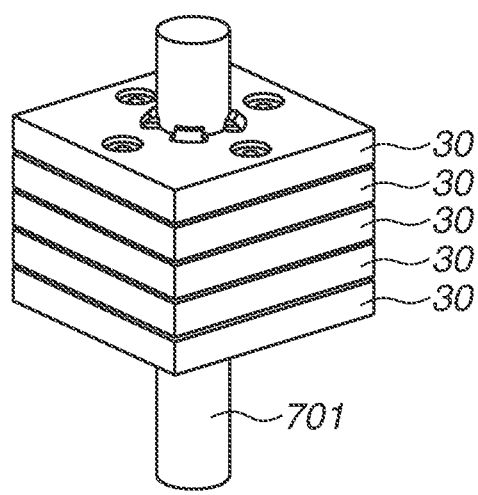
FIG. 10 is an explanatory diagram illustrating a process of manufacturing a reflective coating of the polygon mirror according to the second exemplary embodiment.

Next, in a cooling process in FIG. 9A, the mold 140 is set to a predetermined temperature lower than a temperature of the molten resin M1 so that the molten resin M1 is cooled and hardened and the resin member 30 is formed. The mold 140 uses, for example, a water cooling system and is cooled to the predetermined temperature using water.

Figure 9B:
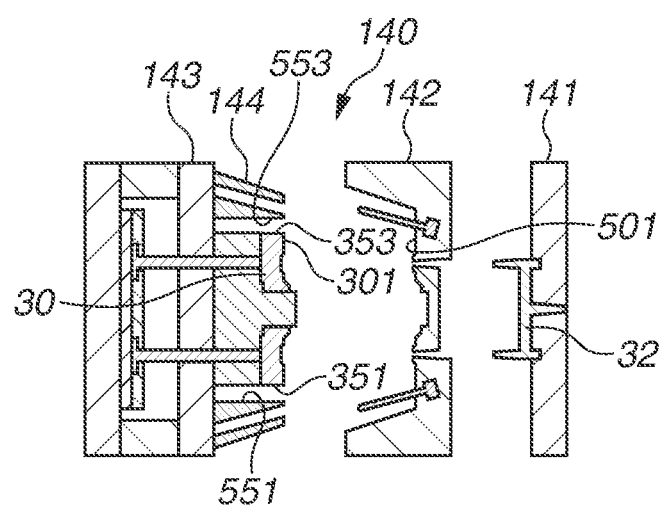

After the resin member 30 is sufficiently cooled, the mold 140 is opened in a mold opening process in FIG. 9B. In this process, the top surface forming surface 501 of the cavity plate 142 is separated from the top surface 301 of the resin member 30, and the side surface forming surfaces 551 to 554 illustrated in FIGS. 7A and 7B of the slide core 144 are separated from the outer surfaces 351 to 354 illustrated in FIGS. 3A and 3B of the resin member 30. Further, a runner 32 connected to the resin member 30 is separated from the resin member 30 by the runner stripper plate 141.

Figure 9C:
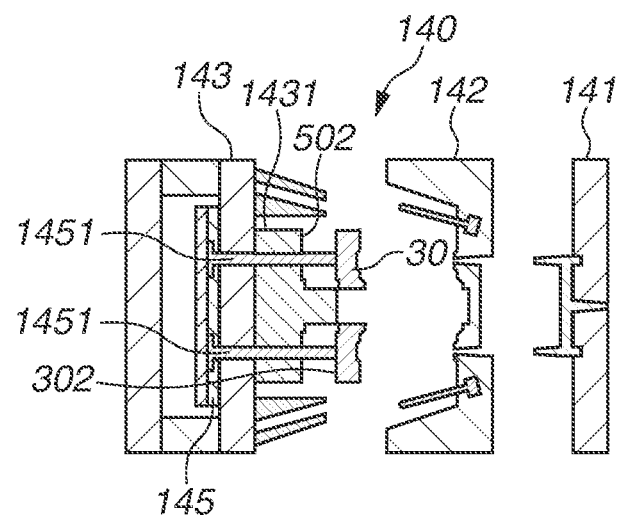

Then, in a mold-release process illustrated in FIG. 9C, the ejector plate 145 is moved forward toward the moving-side core 1431 so that the ejector pin 1451 protrudes from the moving-side core 1431, and the bottom surface 302 of the resin member 30 is separated from the bottom surface forming surface 502 of the moving-side core 1431. Thus, the resin member 30 is released from the mold 140.

Thereafter, in a vapor deposition process, the plurality of resin members 30 is stacked on a vapor deposition peg 701 as illustrated in FIG. 10. The projections 311 to 314 of the resin member 30 illustrated in FIGS. 3A and 3B are inserted into to the depressed portions 321 to 324, whereby the outer surfaces 351 to 354 of the resin member 30 are aligned.

As described above, the height H1 of the projections 311 to 314 is greater than the depth D1 of the depressed portions 321 to 324. Thus, in a case where the resin members 30 are stacked, a predetermined space is formed between the top surface 301 of a lower resin member 30 and the bottom surface 302 of an upper resin member 30, and the resin members 30 are aligned at regular spaces. Further, the height S1 of the tilt portion 3124 of the side surface 3123 of the projection 312 in the rotation direction of the resin member 30 is equal to or less than the difference between the height H1 of the projections 311 to 314 and the depth D1 of the depressed portions 321 to 324. Thus, interference between the depressed portion 322 and the tilt portion 3124 of the side surface 3123 of the projection 312 in the rotation direction of the resin member 30 is prevented.

Then, a metal, such as aluminum, is deposited by vapor deposition on the outer surfaces 351 to 354 of the resin member 30, whereby the reflective coating 31 in FIGS. 2A and 2B to be a light reflecting surface is formed on the outer surfaces 351 to 354. Thus, the polygon mirror 3 is manufactured.

A description will be given of a case of using a mold having the side surfaces, of the depressed portions 511 to 514 on the side in the direction vertical to the virtual line C0, not tilted with respect to the virtual line C0, and the side surfaces, of the depressed portions 511 to 514 on the side in the rotation direction of the resin member 30, not having the tilt portions. Specifically, this is a case of manufacturing a resin member of a comparative example using a mold having the side surface 3112, of the projection 311 of the resin member 30 on the side in the direction vertical to the virtual line C0, not tilted with respect to the virtual line C0, and the side surface 3124, of the projection 312 of the resin member 30 on the side in the rotation direction of the resin member 30, not having the tilt portion 3124. In the mold opening process, when the mold is opened and a top surface forming surface of a cavity plate is separated from a top surface of the resin member 30, a significant release resistance is generated between the side surface of the depressed portion 511 on the side in the direction vertical to the virtual line C0 and the side surface 3112 of the projection 311 on the side in the direction vertical to the virtual line C0. Similarly, a significant release resistance is generated between the side surface of the depressed portion 512 on the side in the rotation direction of the resin member 30 and the side surface 3123 of the projection 312 on the side in the rotation direction of the resin member 30. In a case where a release resistance between the top surface of the resin member and the top surface forming surface of the cavity plate increases, the top surface of the resin member and the top surface forming surface of the cavity plate are not separated, which causes a residue of the resin member on the cavity plate and results in a release defect.

Thus, in the present exemplary embodiment, the resin member 30 is formed using the mold having the side surfaces, of the depressed portions 511 to 514 on the side in the direction vertical to the virtual line C0, tilted with respect to the virtual line C0, in order to decrease the release resistance between the top surface 301 of the resin member 30 and the top surface forming surface 501 of the cavity plate 142. Since the side surfaces of the depressed portions 511 to 514 on the side in the direction vertical to the virtual line C0 are tilted with respect to the virtual line C0, the release resistance generated between the side surfaces of the depressed portions 511 to 514 on the side in the direction vertical to the virtual line C0 and the side surfaces of the projections 311 to 314 on the side in the direction vertical to the virtual line C0 decreases. Thus, the top surface 301 of the resin member 30 and the top surface forming surface 501 of the cavity plate 142 are stably separated, and the possibility of a release defect due to a residue of the resin member 30 on the cavity plate 142 is reduced.

A tilt angle between the side surfaces of the depressed portions 511 to 514 on the side in the rotation direction of the resin member 30 of the mold and the virtual line C0 will be referred to as a "tilt angle θ1". Specifically, a tilt angle between the side surface 3112 of the projection 311 on the side in the direction vertical to the virtual line C0 and the virtual line C0 is defined as a "tilt angle θ1". Further, a tilt angle between the side surfaces of the depressed portions 511 to 514 on the side in the rotation direction of the resin member 30 of the mold and the virtual line C0 will be referred to as a "tilt angle θ2". Specifically, a tilt angle between the tilt portion 3124 of the side surface 3123 of the projection 312 on the side in the rotation direction of the resin member 30 and the virtual line C0 is defined as a "tilt angle θ2". The tilt angles θ1 and θ2 are desirably greater than or equal to 10 degrees and smaller than or equal to 60 degrees, in view of mold releasability of the resin member 30 in the mold opening process and stiffness of the resin member 30. The tilt angles θ1 and θ2 are, for example, 45 degrees. If the tilt angles θ1 and θ2 are smaller than 10 degrees, the top surface 301 of the resin member 30 and the top surface forming surface 501 of the cavity plate 142 are not stably separated in the mold opening process, and an occurrence of a release defect may significantly increase. Further, if the tilt angle θ1 is greater than 60 degrees, distortions originating from the shapes of the projections 311 to 314 increase in the cooling process, and there arises a concern that the shape accuracy of the outer surfaces 351 to 354 may deteriorate.

In order to increase the shape accuracy of the outer surfaces 351 to 354 of the resin member 30 and the bottom surface 302 in contact with the seat 2, the side surface forming surfaces 551 to 554 and the bottom surface forming surface 502 for forming the outer surfaces 351 to 354 and the bottom surface 302 of the resin member 30 are desirably provided on the same core plate, i.e., the core plate 143. Further, in order to prevent interference between the bottom surface 302 of the resin member 30 and the seat 2, the bottom surface 302 of the resin member 30 desirably includes the depressed portions 321 to 324 depressed from the bottom surface 302, the top surface 301 facing the bottom surface 302 desirably includes the projections 311 to 314 protruding from the top surface 301. Thus, the top surface forming surface 501 is disposed on the cavity plate 142 of the mold 140, and the bottom surface forming surface 502 is disposed on the core plate 143. Since the depressed portions 511 to 514 of the top surface forming surface 501, which are depressed from the top surface forming surface 501, have the shape according to the present exemplary embodiment, the top surface 301 of the resin member 30 and the top surface forming surface 501 of the cavity plate 142 are stably separated. This decreases the possibility of an occurrence of a release defect due to a residue of the resin member 30 on the cavity plate 142, and consequently a manufacturing yield of the polygon mirror 3 made of resin increases.

According to the present exemplary embodiment, the resin member 30 is formed using the mold having the side surfaces, of the depressed portions 511 to 514 on the side in the rotation direction of the resin member 30, having the tilt portions, in order to decrease the release resistance between the top surface 301 of the resin member 30 and the top surface forming surface 501 of the cavity plate 142.

Since the side surface of the depressed portion 512 on the side in the rotation direction of the resin member 30 include the tilt portion, the release resistance generated between the side surface of the depressed portion 512 on the side in the rotation direction of the resin member 30 and the side surface 3123 of the projection 312 on the side in the rotation direction of the resin member 30 decreases. Consequently, the top surface 301 of the resin member 30 and the top surface forming surface 501 of the cavity plate 142 are stably separated, and the possibility of an occurrence of a release defect due to a residue of the resin member 30 on the cavity plate 142 decreases. This further increases the manufacturing yield of the polygon mirror 3 made of resin.

A length of each side surface of the resin member 30 is desirably greater than or equal to 10 mm and less than or equal to 30 mm, for example, desirably 14.1 mm, or desirably a circumscribed circle diameter of 20 mm. Further, a thickness of the resin member 30 is desirably greater than or equal to 0.5 mm and less than or equal to 10 mm, for example, desirably 2 mm.

Further, the holes 181 to 184 of the top surface 301 include gate marks 171, 172, 173, and 174 corresponding to the gates 571 to 574 serving as four resin inlets. The holes 181 to 184 are at the same distance from the through hole 16. Further, the holes 181 to 184 have a circular truncated cone shape and have the gate marks 171 to 174 at centers of the holes 181 to 184. A relative position among the outer surfaces 351 to 354 and a relative positon among the gate marks 171 to 174 correspond to each other. The outer surfaces 351 to 354 and the gate marks 171 to 174 have rotation symmetries with respect to the virtual line C0.

Next, the polygon mirror 3 according to a third exemplary embodiment will be described below. Redundant descriptions of components according to the third exemplary embodiment that are similar to those according to the first and second exemplary embodiments are omitted.

Figure 11A:
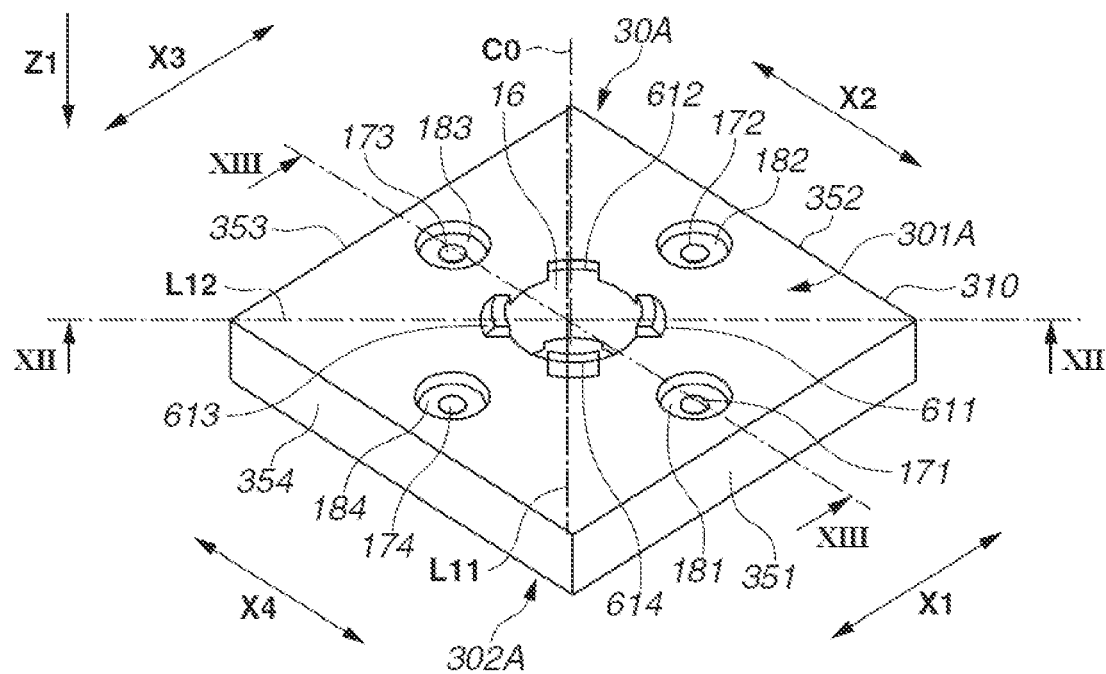
FIGS. 11A and 11B are perspective views illustrating a resin member of a polygon mirror according to a third exemplary embodiment.
Figure 11B:
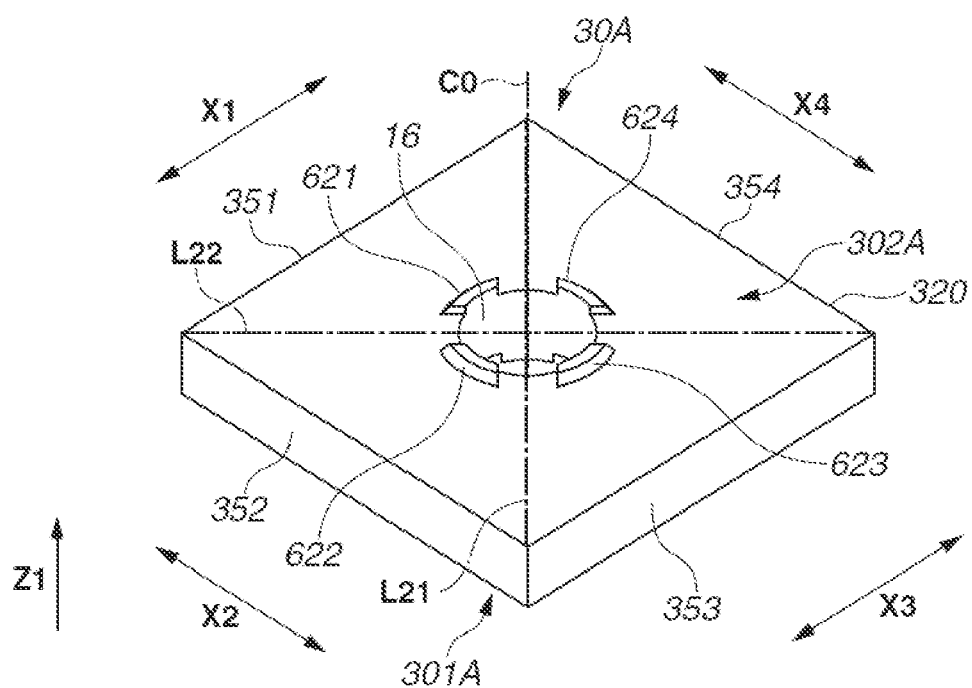
Figure 12A:
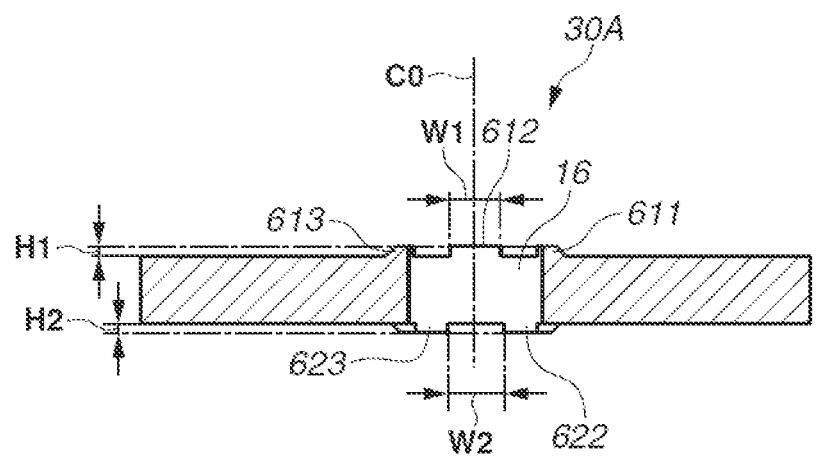
FIG. 12A is a first cross-sectional view illustrating the resin member according to the third exemplary embodiment.
Figure 12B:
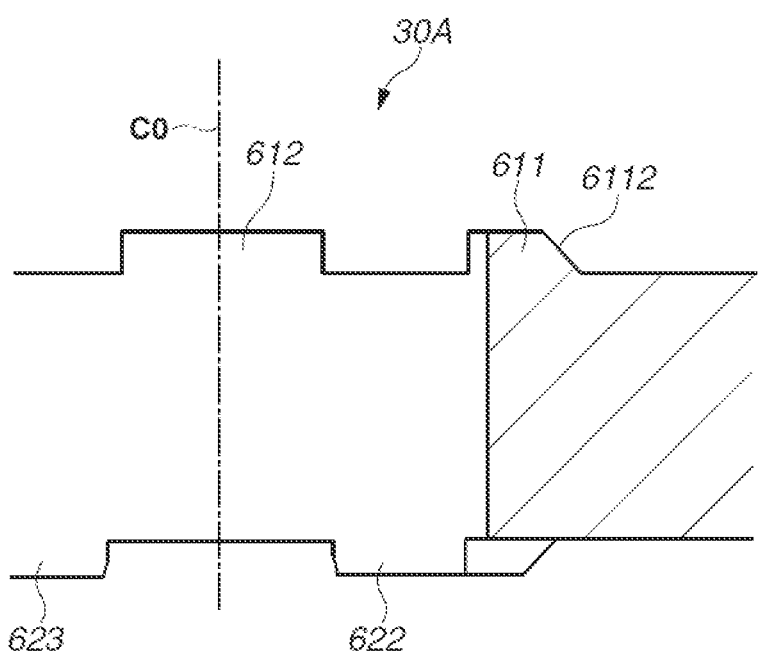
FIG. 12B is an enlarged view illustrating a main portion of the resin member illustrated in FIG. 12A.
Figure 13:
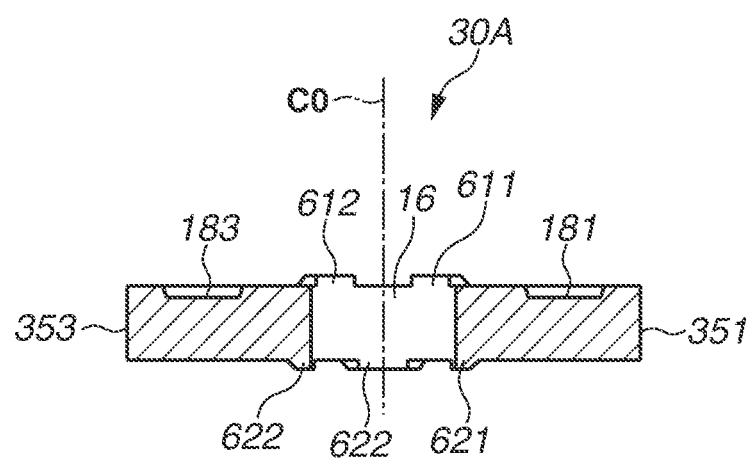
FIG. 13 is a second cross-sectional view illustrating the resin member according to the third exemplary embodiment.

FIGS. 11A and 11B are perspective views illustrating a resin member 30A of the polygon mirror 3 according to the third exemplary embodiment. FIG. 11A is a top perspective view of the resin member 30A of the polygon mirror 3 according to the third exemplary embodiment, and FIG. 11B is a bottom perspective view of the resin member 30A of the polygon mirror 3 according to the third exemplary embodiment. FIG. 12A is a cross-sectional view illustrating the resin member 30A according to the third exemplary embodiment. FIG. 12A illustrates a section of the resin member 30A taken along a line XII-XII in FIG. 11A. FIG. 12B is an enlarged view illustrating a main portion of the resin member 30A illustrated in FIG. 12A. FIG. 13 illustrates a section of the resin member 30A taken along a line XIII-XIII in FIG. 11A.

A configuration of the resin member 30A of the polygon mirror 3 according to the third exemplary embodiment is different from that according to the second exemplary embodiment. Specifically, while the description has been given of a case where the bottom surface 302 includes the depressed portions 321 to 324 in the second exemplary embodiment, a description will be given of a case where a bottom surface includes a second projection in the third exemplary embodiment.

According to the present exemplary embodiment, a top surface 301A includes first projections 611, 612, 613, and 614, and either side surfaces of the first projections 611 to 614 on a side in the direction vertical to the virtual line C0 or side surfaces on a side in a rotation direction of the resin member 30A are surfaces tilted with respect to the virtual line C0. This structure is similar to the second exemplary embodiment. The first projections 611 to 614 have configurations similar to each other.

A structure of a bottom surface 302A that is different from the second exemplary embodiment will be described below. The second segment 320 will be referred to as "second reference" of a height from the second segment 320 between the second surface and the outer surfaces 351 to 354 in the direction to the first segment 310. The bottom surface 302A includes second projections 621, 622, 623, and 624 that project from the second reference toward a side opposite to the top surface 301A and are disposed at positions corresponding to phases of the outer surfaces 351 to 354 about the virtual line C0. While, in the present exemplary embodiment, the number of the second projections disposed on the diagonal lines L21 and L22 is four, i.e., the second projections 621 to 624, the least number of the second projections is one. Further, each side surface of the second projections 621 to 624 on the side in the direction vertical to the virtual line C0 can include a tilt portion. Similarly, each side surface of the second projections 621 to 624 on the side in the rotation direction of the resin member 30A can include a tilt portion. The second projections 621 to 624 form the inner surface 330. The second projections 621 to 624 have configurations similar to each other.

The first projections 611 to 614 are provided at positions different from positions of the second projections 621 to 624 in the direction from the first segment 310 to the second segment 320. Specifically, the first projections 611 to 614 and the second projections 621 to 624 are disposed in such a manner that the phases of the first projections 611 to 614 and the second projections 621 to 624 about the virtual line C0 are shifted by half from each other, which facilitates engagement in stacking the plurality of the resin members 30A.

While the height H1 of the first projections 611 to 614 is equal to the height H2 of the second projections 621 to 624 in the present exemplary embodiment, the heights H1 and H2 do not necessarily have to be equal. While, in the present exemplary embodiment, the heights H1 and H2 are, for example, 0.3 mm, the heights H1 and H2 may be 0.1 mm to 0.5 mm. The side surface 6112 of the first projection 611 on the side in the direction vertical to the virtual line C0 is tilted with respect to the virtual line C0. The width W1 of the first projections 611 to 614 in the rotation direction of the resin member 30A is less than the width W2 between the second projections 621 to 624 in the rotation direction of the resin member 30A.

In a case where the plurality of resin members 30A is stacked, a space is formed between the top surface 301A of a lower resin member 30A and the bottom surface 302A of an upper resin member 30A, and the resin members 30A are aligned at regular spaces.

Figure 14A:
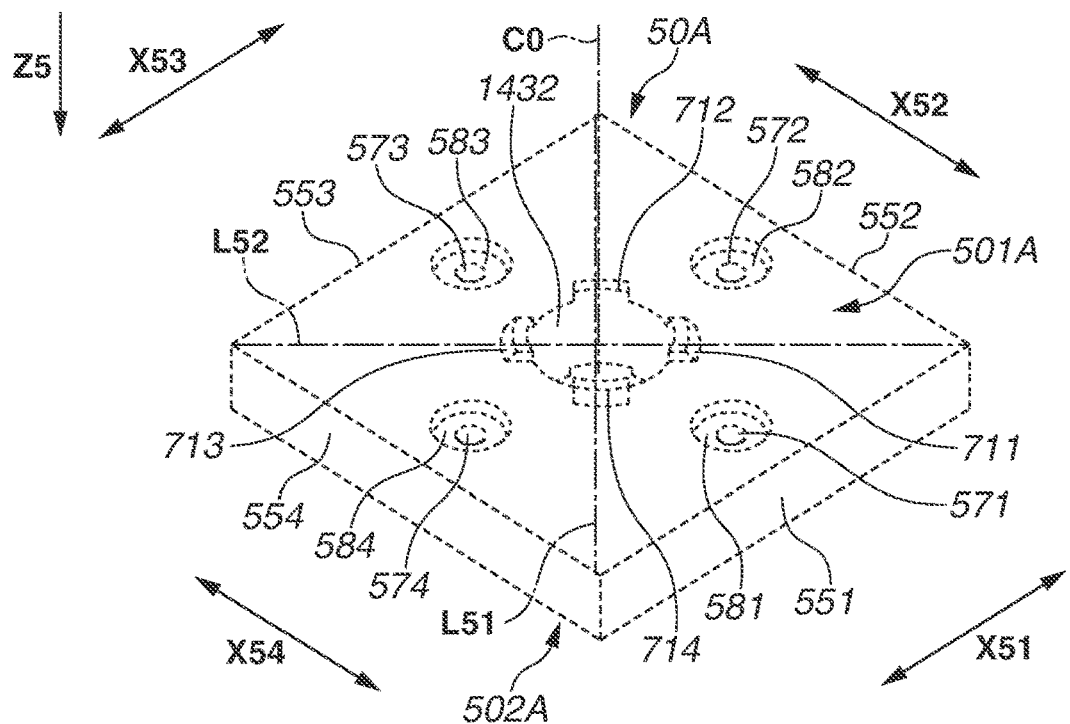
FIGS. 14A and 14B are perspective views illustrating a cavity of a mold according to the third exemplary embodiment.
Figure 14B:
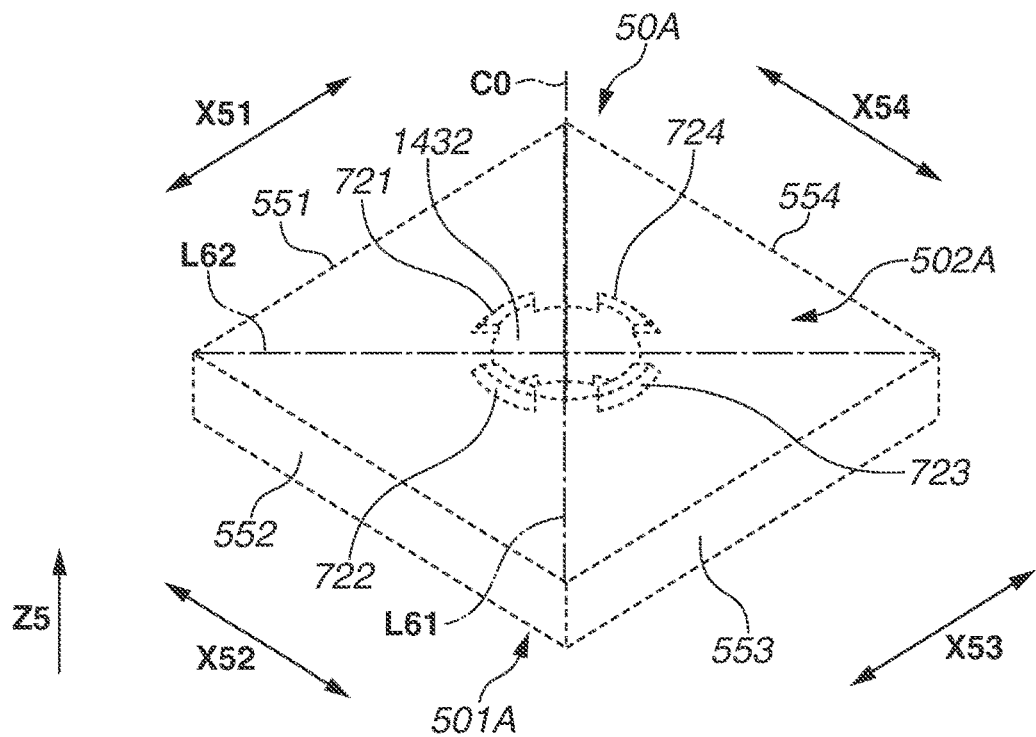

Next, a portion of a mold for use in manufacturing the resin member 30A that is different from the second exemplary embodiment will be described below. FIGS. 14A and 14B are perspective views illustrating a cavity 50A of a mold 140A according to the third exemplary embodiment. FIG. 14A is a top perspective view of the cavity 50A, and FIG. 14B is a bottom perspective view of the cavity 50A.

A bottom surface forming surface 502A includes second depressed portions 721, 722, 723, and 724 that are depressed from the bottom surface forming surface 502A and disposed at positions corresponding to the phases of the side surface forming surfaces 551 to 554 about the virtual line C0. While, in the present exemplary embodiment, the number of the second depressed portions disposed at the positions corresponding to the phases of the side surface forming surfaces 551 to 554 about the virtual line C0 are four, i.e., the second depressed portions 721 to 724, the least number of the second depressed portions is one. The second depressed portions 721 to 724 can include tilt portions. Since a top surface forming surface 501A has a configuration similar to the configuration in the above-described exemplary embodiment, the redundant description will be omitted.

The second depressed portions 721 to 724 are molding portions corresponding to the second projections 621 to 624. Since first depressed portions 711 to 714 have configurations similar to the configurations in the above-described exemplary embodiment, the redundant description will be omitted.

A method for manufacturing the polygon mirror 3 according to the third exemplary embodiment is similar to that according to the second exemplary embodiment, so that redundant descriptions thereof are omitted.

The present disclosure is not limited to the above-described exemplary embodiments, and various modifications can be made within the technical concept of the present disclosure. Further, effects described in the exemplary embodiments are a mere list of most desirable effects produced by the present disclosure, and effects of the present disclosure are not limited to those according to the exemplary embodiments.

While, in the exemplary embodiments, the descriptions have been given of cases where the resin member of the polygon mirror 3 has a rectangular prism shape having four side surfaces, the present disclosure is not limited to those described above. The resin member may be a prism shape having four or more side surfaces. More specifically, the resin member desirably has a rectangular prism shape, a pentagonal prism shape, or a hexagonal prism shape.

Further, in the exemplary embodiments, the descriptions have been given of cases where the outer shapes of top and bottom surfaces of the resin member are square, i.e., the sides have the same length, the present disclosure is not limited to those described above. The top and bottom surfaces may be polygons with four or more sides, and the sides can have lengths different from each other. In an image forming apparatus, the top and bottom surfaces are desirably regular polygons.

Further, while, in the exemplary embodiments, the descriptions have been given of cases where the number of projections and the number of depressed portions are the same as the number of side surfaces, the present disclosure is not limited to those described above, as long as the projection and the depressed portion or the projection and another projection are engaged together in stacking resin members in the vapor deposition process, and at least one projection and at least one depressed portion are provided. It should be noted that the number of projections and the number of depressed portions are the same as the number of side surfaces or an integral multiple of the number of side surfaces. As long as the projection and the depressed portion or the projection and another projection are engaged together, there can be a case where the projection is not disposed on the diagonal line of the top surface, or projections do not disposed at regular spaces.

The above-described exemplary embodiments can be changed as needed without departing from the technical concept. For example, a plurality of exemplary embodiments can be combined together. Further, an item of at least one exemplary embodiment can be deleted or replaced.

Further, a new item can be added to at least one exemplary embodiment. The disclosure of the present specification encompasses not only those that are explicitly described in the present specification but also all items that can be understood from the present specification and the drawings attached to the present specification.

Further, the disclosure of the present specification encompasses the complement of individual concepts described in the present specification. Specifically, in a case where the present specification includes, for example, the description "A is greater than B", even if the description "A is not greater than B" is omitted, it is considered that the present specification discloses that "A is not greater than B" for the following reason. Specifically, in a case where the description "A is greater than B" is included, it is assumed that a case where "A is not greater than B" is considered.

The present disclosure provides a technique that is advantageous in improving optical characteristics of polygon mirrors.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-090316, filed May 28, 2021, which is hereby incorporated by reference herein in its entirety.

What is claimed is:

1. A polygon mirror including a resin member, the polygon mirror comprising:
   a first surface;
   a second surface facing the first surface;
   an inner surface joining the first surface and the second surface, as a surface surrounding a through hole extending from the first surface to the second surface; and
   a plurality of outer surfaces joining the first surface and the second surface on a side opposite to the inner surface,
   wherein a first segment between the first surface and the plurality of outer surfaces is defined as a first reference of a height in a direction from a second segment between the second surface and the plurality of outer surfaces to the first segment,
   wherein the first surface includes a plurality of projections projecting from the first reference toward a side opposite to the second surface,
   wherein the second segment is defined as a second reference of the height in the direction from the second segment to the first segment,
   wherein the second surface includes at least one depressed portion depressed from the second reference toward the first surface,
   wherein the at least one depressed portion is distant from the plurality of outer surfaces, and
   wherein at least one projection of the plurality of projections forms the inner surface.

2. The polygon mirror according to claim 1, wherein surfaces of the at least one projection of the plurality of projections on a side in a direction perpendicular to a rotation axis of the resin member include a surface of the at least one projection on a side of the plurality of outer surfaces that is a surface tilted with respect to the rotation axis.

3. The polygon mirror according to claim 2, wherein a tilt angle of the surface of the at least one projection on the side of the plurality of outer surfaces is greater than or equal to 10 degrees and smaller than or equal to 60 degree.

4. The polygon mirror according to claim 1, wherein surfaces of the at least one depressed portion include a surface of the at least one depressed portion on a side of the plurality of outer surfaces that is a surface tilted with respect to a rotation axis of the resin member.

5. The polygon mirror according to claim 1, wherein surfaces of the at least one depressed portion include a surface of the at least one depressed portion on a side in a rotation direction of the resin member that is a surface tilted with respect to a rotation axis of the resin member.

6. The polygon mirror according to claim 1, wherein the following relational expression is satisfied:

$$H > D,$$

where H is a height of the at least one projection of the plurality of projections and D is a depth of the at least one depressed portion.

7. The polygon mirror according to claim 1, wherein the at least one projection of the plurality of projections overlaps the at least one depressed portion at least partially in a direction from the first segment to the second segment.

8. The polygon mirror according to claim 1, wherein surfaces of the at least one projection of the plurality of projections include a surface on a side in a rotation direction of the resin member that is a first surface tilted with respect to a rotation axis of the resin member.

9. The polygon mirror according to claim 8, wherein the surfaces of the at least one projection of the plurality of projections on the side in the rotation direction of the resin member include a second surface having a tilt with respect to the rotation axis that is less than a tilt of the first surface tilted with respect to the rotation axis.

10. The polygon mirror according to claim 9, wherein a height of a surface of the at least one projection of the plurality of projections on a side of the plurality of outer surfaces is greater than a height of the tilted surface on the side in the rotation direction of the resin member.

11. The polygon mirror according to claim 1, wherein a quantity of the at least one projection of the plurality of projections is equal in number to an integral multiple of the plurality of outer surfaces.

12. An optical deflector comprising:
the polygon mirror according to claim 1; and
a driving source configured to rotate and drive the polygon mirror.

13. An optical scanning device comprising:
a light source; and
an optical deflector that includes the polygon mirror according to claim 1, and includes a driving source configured to rotate and drive the polygon mirror,
wherein the optical deflector is configured to deflect light emitted from the light source.

14. An image forming apparatus comprising:
an image forming unit configured to form an image on a sheet,
wherein the image forming unit includes:
an image bearing member, and
an optical scanning device having a driving source and a light source, and having an optical deflector that includes the polygon mirror according to claim 1, and
wherein the driving source is configured to rotate and drive the polygon mirror, the optical deflector is configured to deflect light emitted from the light source, and the optical scanning device is configured to scan a surface of the image bearing member with light.

15. A polygon mirror including a resin member, the polygon mirror comprising:
a first surface;
a second surface facing the first surface;
an inner surface joining the first surface and the second surface, as a surface surrounding a through hole extending from the first surface to the second surface; and
a plurality of outer surfaces joining the first surface and the second surface on a side opposite to the inner surface,
wherein a first segment between the first surface and the plurality of outer surfaces is defined as a first reference of a height in a direction from a second segment between the second surface and the plurality of outer surfaces to the first segment,
wherein the first surface includes a plurality of projections projecting from the first reference toward a side opposite to the second surface,
wherein the second segment is defined as a second reference of the height in the direction from the second segment to the first segment,
wherein the second surface includes at least one depressed portion depressed from the second reference toward the first surface,
wherein the at least one depressed portion is distant from the plurality of outer surfaces,
wherein at least one projection of the plurality of projections forms the inner surface, and
wherein a quantity of depressed portions and a quantity of projections are equal in number.

16. A polygon mirror including a resin member, the polygon mirror comprising:
a first surface;
a second surface facing the first surface;
an inner surface joining the first surface and the second surface, as a surface surrounding a through hole extending from the first surface to the second surface; and
a plurality of outer surfaces joining the first surface and the second surface on a side opposite to the inner surface,
wherein a first segment between the first surface and the plurality of outer surfaces is defined as a first reference of a height in a direction from a second segment between the second surface and the plurality of outer surfaces to the first segment,
wherein the first surface includes at least one projection projecting from the first reference toward a side opposite to the second surface, and
wherein surfaces of the at least one projection include a surface of the at least one projection on a side in a rotation direction of the resin member that is a surface tilted with respect to a rotation axis of the resin member.

17. The polygon mirror according to claim 16, wherein the second segment is defined as a second reference of the height in the direction from the second segment to the first segment, and the second surface includes at least one depressed portion depressed from the second reference toward the first surface.

18. The polygon mirror according to claim 16,
wherein the at least one projection is defined as a first projection,
wherein the second segment is defined as a second reference of the height in the direction from the second segment to the first segment, and the second surface includes at least one second projection projecting from the second reference toward a side opposite to the first surface,
wherein the first projection and the at least one second projection form the inner surface, and
wherein the first projection is disposed at a position different from a position of the at least one second projection in the direction from the second segment to the first segment.

19. A polygon mirror including a resin member, the polygon mirror comprising:
a first surface;

a second surface facing the first surface;
an inner surface joining the first surface and the second surface, as a surface surrounding a through hole extending from the first surface to the second surface; and
a plurality of outer surfaces joining the first surface and the second surface on a side opposite to the inner surface,
wherein a first segment between the first surface and the plurality of outer surfaces is defined as a first reference of a height in a direction from a second segment between the second surface and the plurality of outer surfaces to the first segment,
wherein the first surface includes a plurality of projections projecting from the first reference toward a side opposite to the second surface,
wherein the second segment is defined as a second reference of the height in the direction from the second segment to the first segment,
wherein the second surface includes at least one depressed portion depressed from the second reference toward the first surface, and
wherein the plurality of projections forms the inner surface.

* * * * *